United States Patent [19]

Sasou et al.

[11] Patent Number: 5,545,883
[45] Date of Patent: Aug. 13, 1996

[54] MAGNETIC CARD AND CARD READER APPARATUS UTILIZING A PSEUDO BAR CODE AND AN ADDRESS INFORMATION CODE

[75] Inventors: Hiroshi Sasou; Takumi Kawashima, both of Tokyo, Japan

[73] Assignee: Tamura Electric Works, Ltd., Japan

[21] Appl. No.: 273,835

[22] Filed: Jul. 12, 1994

[30] Foreign Application Priority Data

Jul. 13, 1993 [JP] Japan .................................. 5-195326

[51] Int. Cl.$^6$ ........................................................ G06K 7/08
[52] U.S. Cl. .......................... 235/449; 235/468; 235/440
[58] Field of Search ................................... 235/440, 468, 235/449, 448

[56] References Cited

U.S. PATENT DOCUMENTS

| | | | |
|---|---|---|---|
| 4,056,712 | 11/1977 | Trenkamp | 235/440 |
| 4,605,846 | 8/1986 | Duret | 235/468 |
| 4,833,310 | 5/1989 | Shimamura | 235/479 |
| 4,837,426 | 6/1989 | Pease | 235/440 |
| 5,336,871 | 8/1994 | Colgate | 235/380 |

*Primary Examiner*—Donald T. Hajec
*Assistant Examiner*—Karl Frech
*Attorney, Agent, or Firm*—Remy J. VanOphem; John VanOphem; Thomas A. Meehan

[57] ABSTRACT

A magnetic card includes a magnetic layer, a bar code, a protection layer, and a pseudo bar code. The magnetic layer is formed on a substrate, records magnetic information, and reflects light. The bar code is formed on a predetermined area of the magnetic layer by a light absorption material and detected by a lack of reflected light from the magnetic layer. The protection layer is formed on the predetermined area of the magnetic layer and protects the bar code. The pseudo bar code is formed on the magnetic layer and intermingled with the bar code. An address information code is provided on the card for determining the bar code form the pseudo bar code. A card reader apparatus using this magnetic card is also disclosed.

11 Claims, 6 Drawing Sheets

BAR CODE–115
PSEUDO BAR CODE–116

MAGNETIC CARD AND CARD READER APPARATUS UTILIZING A PSEUDO BAR CODE AND AN ADDRESS INFORMATION CODE

BACKGROUND OF THE INVENTION

1. Field of the Invention

The present invention relates to a magnetic card in which a bar code printed in advance is prevented from being counterfeited, and a card reader apparatus using this magnetic card.

2. Description of the Prior Art

In a magnetic card used in a card terminal apparatus such as a card type vending machine, a magnetic track is formed on which value information corresponding to a pre-paid amount is magnetically recorded is formed. When the magnetic card serving as a pre-paid card is used in the card terminal apparatus, the value information recorded on the magnetic track is read out, service corresponding to this value information is permitted. This magnetic card has a bar code recording area independent of the magnetic track to improve its security, and a bar code corresponding to an identification code representing, e.g., the face value or the like of an unused card is printed in this bar code recording area. Therefore, in the card terminal apparatus, the bar code information formed in the bar code recording area is read out each time the magnetic card is used to identify the authenticity of the magnetic card, and it is determined depending on this identification result whether the card can be used.

FIG. 8A shows a conventional magnetic card in a card convey direction to explain the above bar code recording area. A magnetic card 1 is constituted by sequentially forming a substrate 11, a magnetic layer 12, a bar code protection layer 13, and an overcoat 14 from the lower direction. A bar code 15 is printed on the magnetic layer 12 with an infrared absorption ink. When infrared rays are radiated on the overcoat 14 of the magnetic card 1 having the above arrangement, the infrared rays are transmitted through the overcoat 14 and the bar code protection layer 13 and then absorbed in the bar code 15. In addition, infrared rays which are incident on a portion having no bar code 15 formed thereon are reflected by the surface of the magnetic layer 12, the reflected light is transmitted through the bar code protection layer 13 and the overcoat 14, output from the surface of the magnetic card 1, and then detected by a detection unit (not shown) of the card terminal apparatus. As a result, the card terminal apparatus can identify the authenticity of the magnetic card 1 by reading the pattern of the bar code 15 formed on the magnetic card 1. If it is determined on the basis of the identification result that the magnetic card is authentic, a predetermined card process such as a process of reproducing information from the magnetic track or a process of recording value information corresponding to the bar code is performed.

FIG. 8B shows a prior art magnetic card 1 which is constituted such that the surface of the magnetic layer is in contact with the overcoat 14 by decreasing the thickness of the bar code protection layer 13, thereby decreasing the total thickness of the magnetic card 1.

In the conventional magnetic card 1, in order to prevent visual identification of the printed bar code 15, the bar code 15 and the magnetic layer 12 are covered with the bar code protection layer 13 and the overcoat 14. However, if the overcoat 14 and the bar code protection layer 13 are filed by a file or the like, the pattern of the bar code 15 is exposed to be easily, visually recognized. As a result, the pattern of the bar code 15 of the magnetic card 1 can be easily decoded. In the thin magnetic card shown in FIG. 8A, the probability of decoding the pattern becomes higher. In addition, when the bar code 15 can be illegally rewritten by decoding the pattern of the bar code 15, illegal value information based on the illegally rewritten bar code 15 can be recorded on the magnetic tracks. Therefore, the magnetic card 1 can be counterfeited and illegally used.

SUMMARY OF THE INVENTION

It is an object of the present invention to provide a magnetic card which makes it impossible to identify a bar code printed in the card to prevent the bar code from being illegally rewritten.

It is another object of the present invention to provide a magnetic card capable of preventing counterfeit of the card and illegal use of the card and a card reader apparatus using this magnetic card.

In order to achieve the above objects, according to the present invention, there is provided a magnetic card composed of a magnetic layer, formed on a substrate, for recording magnetic information and reflecting light, a bar code formed on a predetermined area of the magnetic layer by a light absorption material and detected by no generation of reflected light from the magnetic layer, a protection layer, formed on the predetermined area of the magnetic layer, for protecting the bar code, and a pseudo bar code formed on the magnetic layer so as to be mixed with the bar code.

DETAILED DESCRIPTION OF THE PREFERRED EMBODIMENTS

Figure 1:
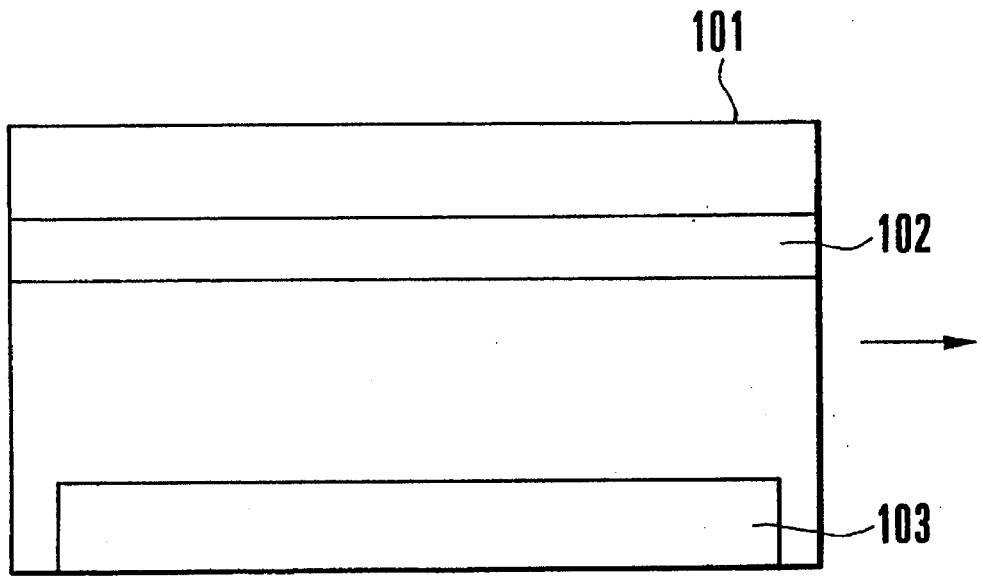
FIG. 1 is a plan view showing an embodiment of a magnetic car according to the present invention.
Figure 2:
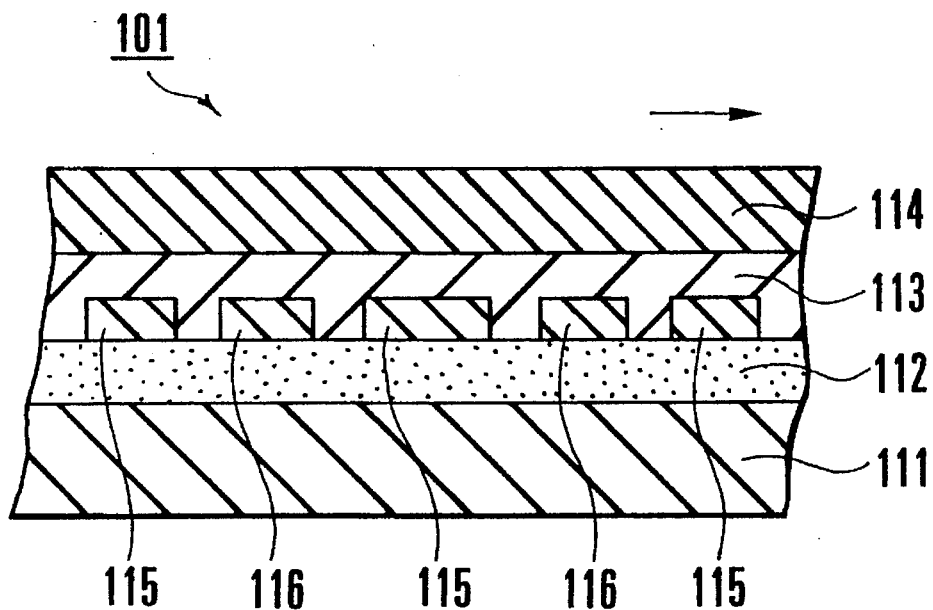
FIG. 2 is a longitudinal sectional view of the magnetic card in FIG. 1 to explain a bar code recording area.

The present invention will be described below with reference to the accompanying drawings. FIG. 1 shows an embodiment of a magnetic card according to the present invention, and FIG. 2 shows the main part of the magnetic card of FIG. 1 in a card convey direction to explain a bar code recording area. Referring to FIG. 1, a magnetic track 102 for recording value information and a bar code recording area 103 in which a bar code representing a value to be recorded on a magnetic card 101 are formed in the magnetic card 101.

Referring to FIG. 2, the bar code recording area 103 is formed by sequentially stacking, from the lower direction, a substrate 111 of the rectangular magnetic card 101, a magnetic layer 112 for recording magnetic information and reflecting infrared rays, a bar code protection layer 113 for protecting a bar code (to be described later), and an overcoat 114 for protecting the underlying layers including the magnetic layer 112. In this case, reference numeral 115 denotes a bar code, and this bar code 115 is printed on the magnetic layer 112 in the bar code recording area 103 with an infrared absorption ink. In addition, reference numeral 116 denotes a pseudo bar code. This pseudo bar code 116 is printed with an infrared transmission ink such that each bar of the pseudo bar code 116 is randomly arranged between bars constituting the bar code 115. For example, a thin bar of the pseudo bar code 116 is printed between thin bars of the bar code 115, and the thin bar of the pseudo bar code 116 is printed adjacent to the thin bars of the bar code 115, thereby visually camouflaging the bar code 115.

In this case, when infrared rays are radiated on the bar code recording area 103, the infrared rays are absorbed in the bar code 115, and, at the same time, the infrared rays are transmitted through other portions including the pseudo bar code 116 except for the bar code 115. The transmitted infrared rays are reflected by the surface of the magnetic layer 112, and the reflected light is transmitted through the bar code protection layer 113 and the overcoat 114, output from the surface of the magnetic card 101, and then detected. Therefore, although the pseudo bar code 116 is printed, only the regular bar code 115 can be detected.

When the surfaces of the overcoat 114 and the bar code protection layer 113 are rubbed by a file or the like, both the bar code 115 and the pseudo bar code 116 are exposed on the surface of the card, so that the bar code 115 and the pseudo bar code 116 can be decoded. However, even if the bar code 115 is to be counterfeited by decoding the bar code 115 including the pseudo bar code 116, since the regular bar code 115 cannot be visually identified from the pseudo bar code 116, the bar code 115 to be illegally rewritten cannot be recognized. Therefore, counterfeiting of the magnetic card 101 by illegally rewriting the bar code 115 printed on the magnetic card 101 can be prevented.

Figure 3:
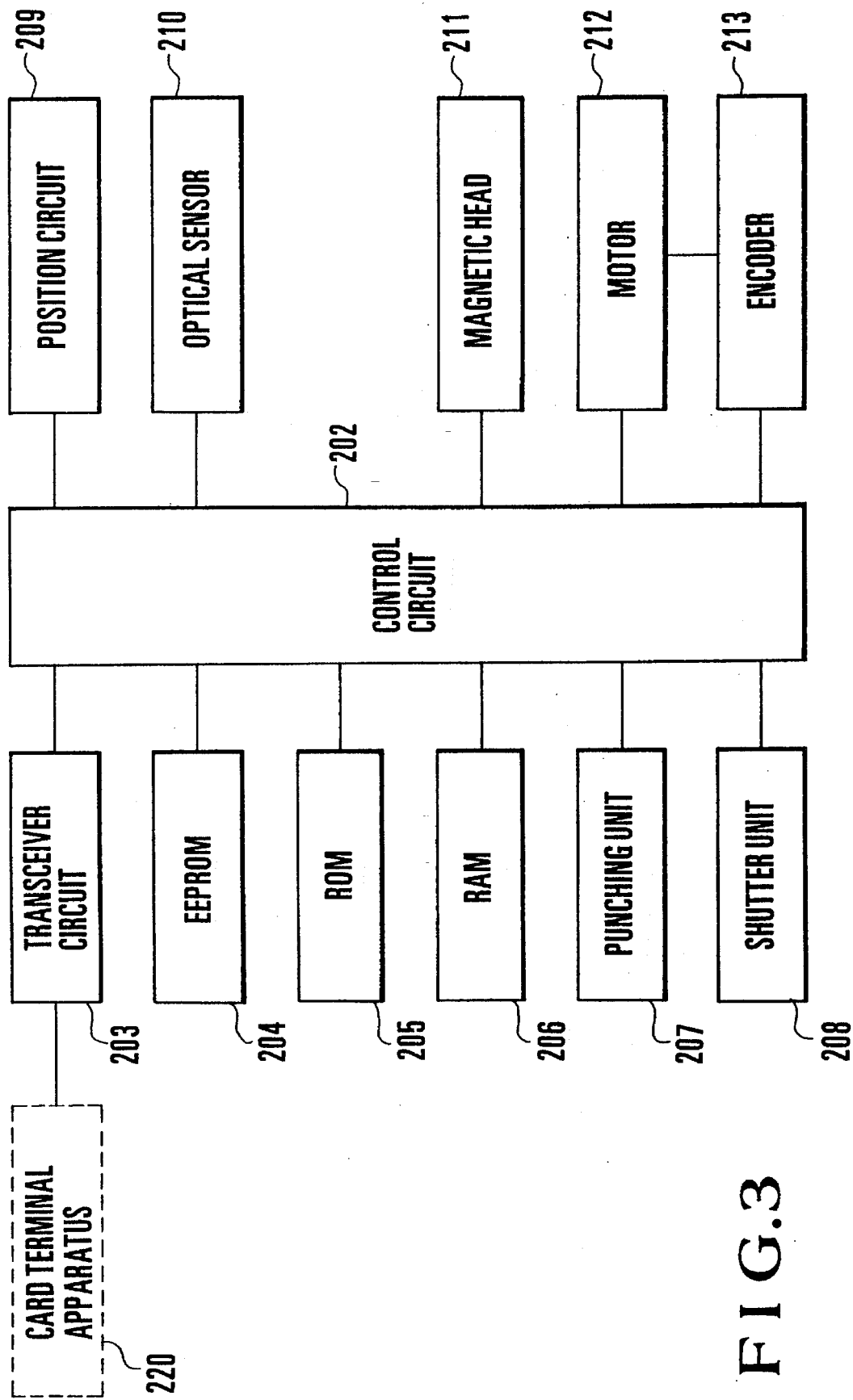
FIG. 3 is a block diagram showing an embodiment of a card reader apparatus for reading/writing information from/on a magnetic card.

FIG. 3 shows the arrangement of a card reader apparatus for reading/writing information from/on the magnetic card 101 arranged as described above. In this case, a control circuit 202 constituted by a CPU (Central Processing Unit) for controlling the card reader apparatus is connected, through a transceiver circuit 203, to a card terminal apparatus 220 serving as a host apparatus of the card reader apparatus. In addition, an EEPROM (Electrically Erasable Programmable Read Only Memory) 204 for storing various parameters or the like required for control, a ROM (Read Only Memory) 205 for storing a program executed by the control circuit 202, a RAM (Random Access Memory) 206 for storing data, a punching unit 207 for forming, in the magnetic card 101, an index hole representing remaining value information, and a shutter unit 208 for preventing continuous insertion of the magnetic card 101.

The card reader apparatus also includes a position circuit 209 having a plurality of position sensors for detecting the position of the magnetic card 101 conveyed in a card convey path (not shown), an optical sensor 210 which is constituted by an infrared source and an infrared sensor and detects the bar code 115 or the like formed in the bar code recording area 103 of the magnetic card 101, a magnetic head 211 for recording/reproducing value information or the like on/from the magnetic card 101, a motor 212 for driving a conveyor belt (not shown) for conveying the magnetic card 101, and an encoder 213 for detecting rotational speed of the motor 212, i.e., the convey speed of the magnetic card 101 are connected to the control circuit 202.

Figure 4:
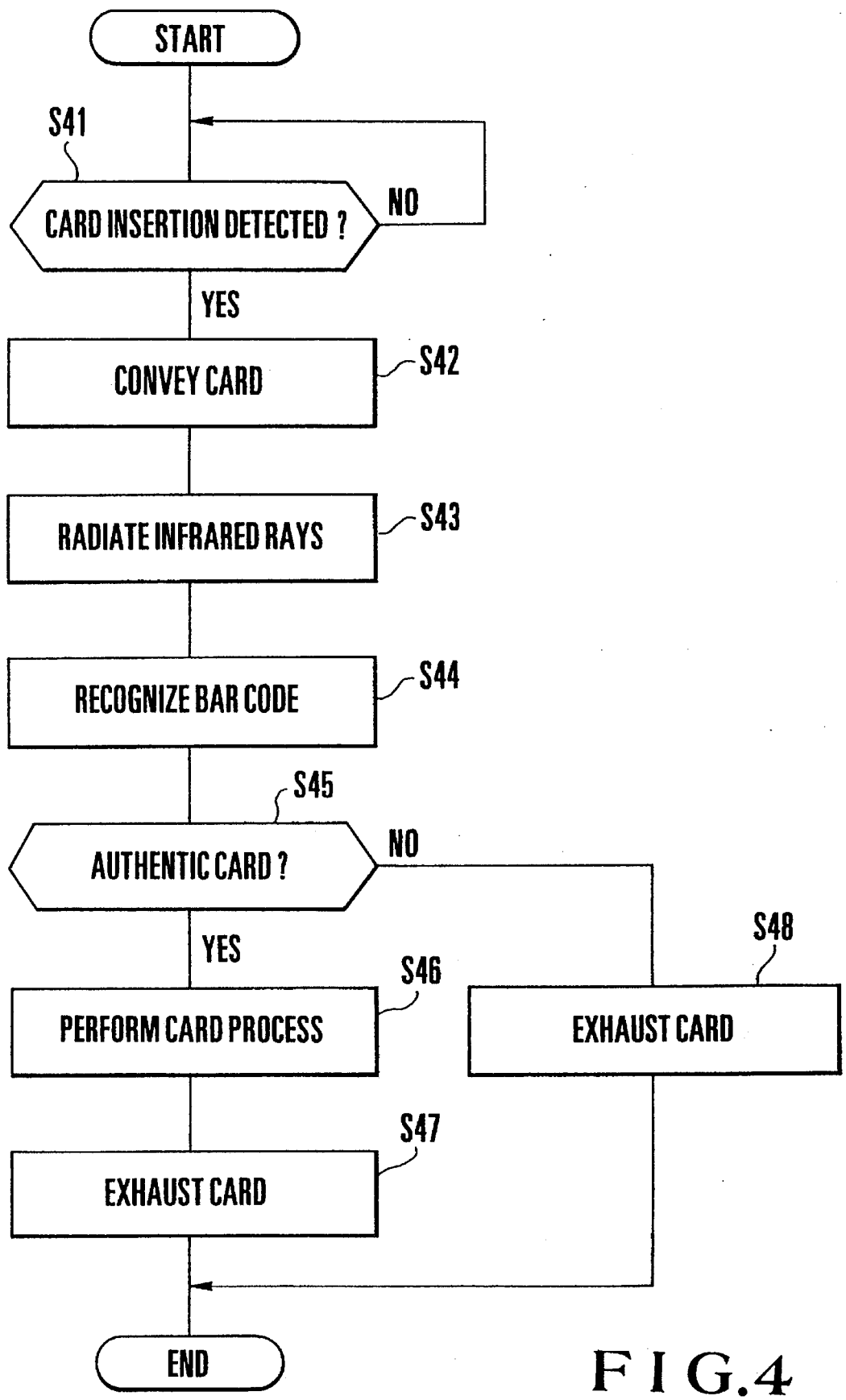
FIG. 4 is a flow chart showing the operation of the card reader apparatus in FIG. 3.

An operation of the main part of the card reader apparatus as described above will be described below on the basis of the flow chart in FIG. 4. When the magnetic card 101 is inserted into the card insertion port (not shown) of the apparatus, the position sensors detect insertion of the magnetic card 101, and the control circuit 202 determines YES in step S41. In step S42, while the control circuit 202 drives the motor 212 and detects outputs from the position sensors of the position circuit 209 located at various positions in the card convey path (not shown), the magnetic card 101 is conveyed to a position where the optical sensor 210 is arranged in the card convey path.

When the bar code recording area 103 of the magnetic card 101 is conveyed to the position of the optical sensor 210, the control circuit 202 causes the optical sensor 210 to radiate infrared rays on the bar code recording area 103 in step S43. The bar code 115 printed in the bar code recording area 103 is detected through the optical sensor 210, and the bar code 115 is recognized in step S44. At this time, as described above, the pseudo bar code 116 is not optically detected.

In step S45, the control circuit 202 checks whether the bar code 115 recognized in step S44 is an authentic bar code. In this case, if YES in step S45, the control circuit 202 drives the magnetic head 211 to execute a card process such as a process of magnetically recording value information based on the bar code 115 on the magnetic card 101 in step S46. Thereafter, the control circuit 202 drives the motor 212 to execute a card exhaust process of exhausting the magnetic card 101 to the card insertion port in step S47. Note that, if NO in step S45, the control circuit 202 immediately executes a card exhaust process in step S48 so that the value information is not magnetically recorded.

In this manner, the bar code 115 printed with an infrared absorption ink and the pseudo bar code 116 printed with an infrared transmission ink are formed on the magnetic layer 112 in the bar code recording area 103 of the magnetic card 101, and the card reader apparatus optically reads only the bar code 115 to check whether the magnetic card 101 is authentic. As a result, even if the bar code 115 is exposed by rubbing the surfaces of the overcoat 114 and the bar code protection layer 113 of the bar code recording area 103 with a file or the like, only the bar code 115 cannot be decoded because the bar code 115 is visually recognized together with the pseudo bar code 116. Therefore, the bar code 115 can be prevented from being illegally rewritten, and counterfeit of the magnetic card 101 performed on the basis of the illegally rewritten bar code can be prevented.

In addition, in the card reader apparatus, since infrared rays are radiated on the bar code recording area 103 to detect the bar code 115, even when the pseudo bar code 116 through which infrared rays are transmitted is formed on the magnetic card 101, detection of the authentic bar code 115 is not adversely affected.

Figure 5:
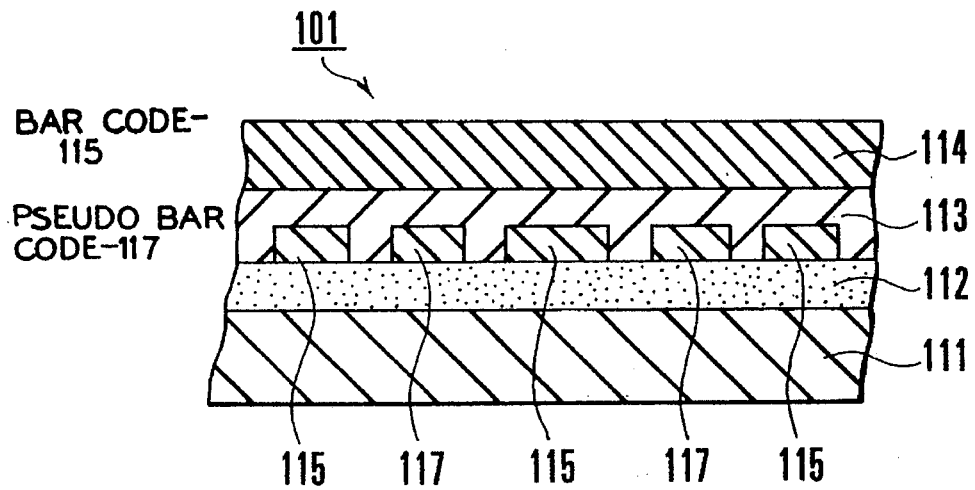
FIG. 5 is a longitudinal sectional view showing the main part of the second embodiment of a magnetic card according to the present invention.

FIG. 5 shows the main part of the second embodiment of the magnetic card. In the magnetic card, a bar code 115 printed with an infrared absorption ink and a pseudo bar code 117 printed with an infrared absorption ink and mixed with the bars of the bar code 115 are formed on a magnetic layer 112 in a bar code recording area 103. In this embodiment, a card terminal apparatus 220 serving as a host apparatus of the card reader apparatus transmits the arrangement position information of the pseudo bar code 117 on a magnetic card 101 through a transceiver circuit 203 to store it in a RAM 206.

When the magnetic card 101 inserted into a card reader apparatus, and a control circuit 202 of the card reader apparatus reads the bar code 115 and the pseudo bar code 117 in the bar code recording area 103 through an optical sensor 210, if the read pseudo bar code 117 is a bar code read at the position stored in the RAM 206, the control circuit 202 performs control not to recognize the pseudo bar code 117 as the authentic bar code 115. Note that only the bar code 115 read at a position except for the position stored in the RAM 206 is recognized and detected as the authentic bar code 115. The read position of the bar code 115 is determined such that the control circuit 202 performs calculations on the basis of detection outputs from position sensors of the position circuit 209 and an encoder 213 after the magnetic card 101 is inserted.

As described above, in the second embodiment, since the bar code 115 and the pseudo bar code 117 can be printed with the same infrared absorption ink, the mass production of magnetic cards 101 can be improved compared with that of the magnetic cards of the first embodiment, and the magnetic card 101 can be manufactured at low costs.

Figure 6:
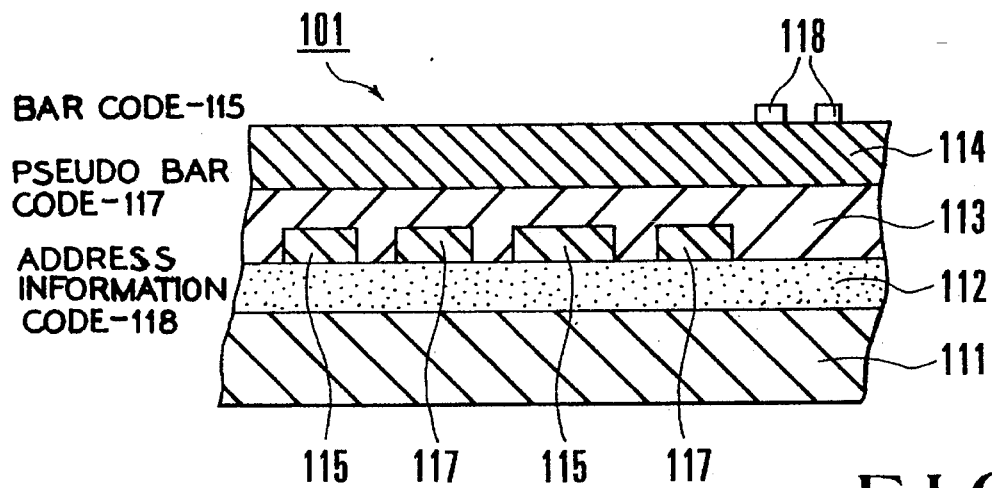
FIG. 6 is a longitudinal sectional view showing the main part of the third embodiment of a magnetic card according to the present invention.
Figure 7:
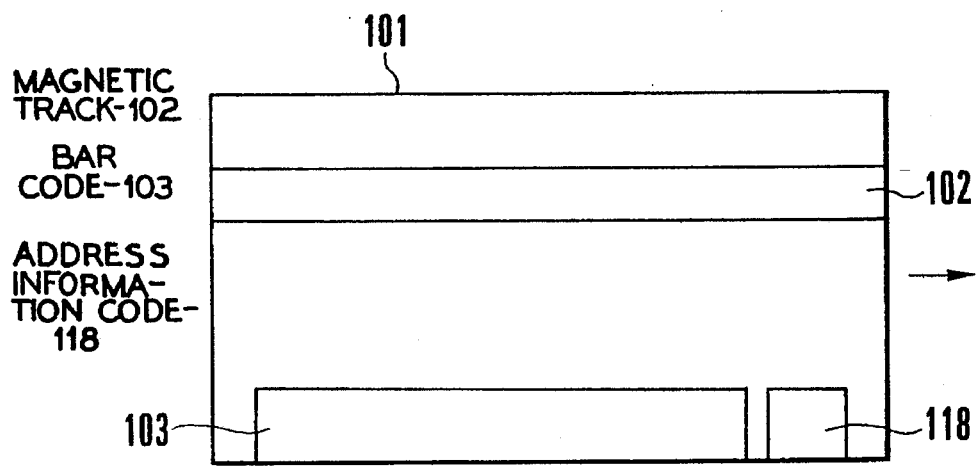
FIG. 7 is a plan view showing the magnetic card in FIG. 6.
Figure 8A:
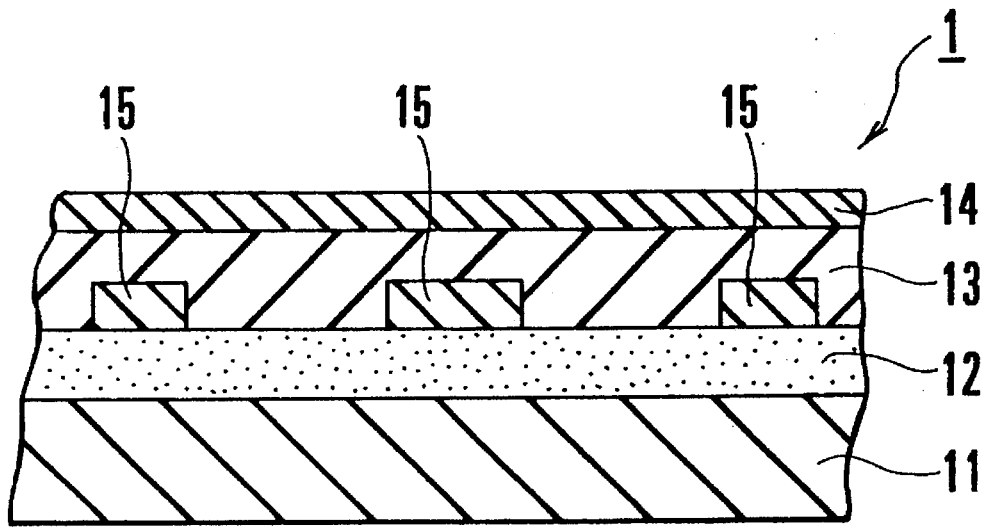
FIGS. 8A and 8B are longitudinal sectional views showing the main parts of conventional magnetic cards, respectively.
Figure 8B:
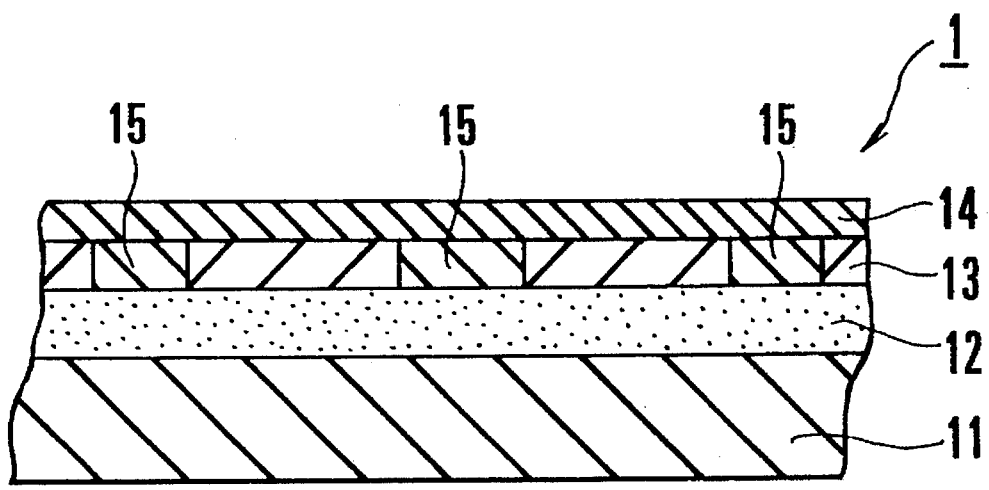
Figure 9:
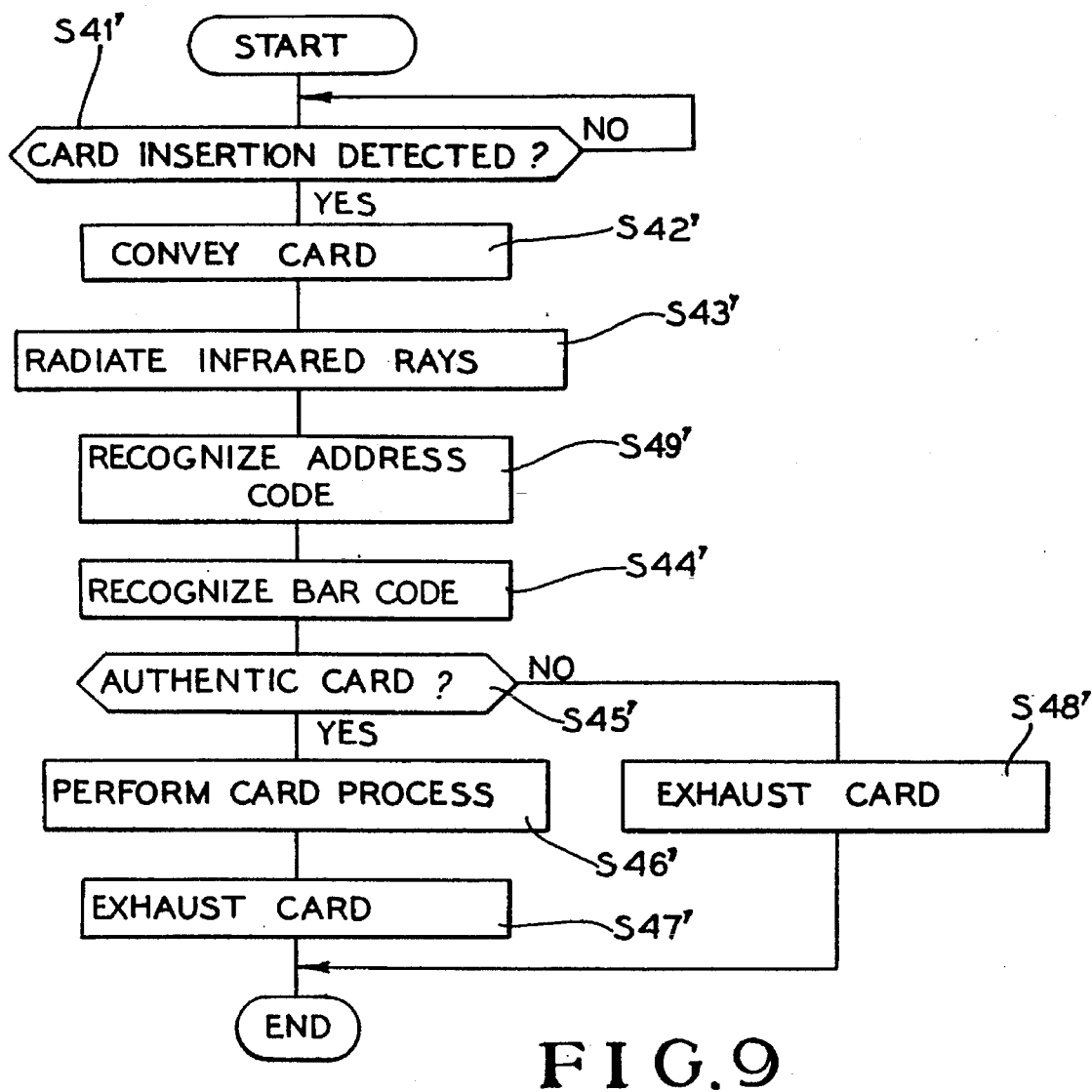
FIG. 9 is a flow chart showing the operation of the card reader apparatus associated with the second and third embodiments of the present invention.

FIG. 6 shows the main part of the third embodiment of a magnetic card, and FIG. 7 shows the magnetic card in FIG. 6. Referring to FIGS. 6 and 7, a pseudo bar code 117 formed on a magnetic layer 112 in a bar code recording area 103 is printed with an infrared absorption ink, as in the second embodiment. An address bar code 118 representing the arrangement position information of the pseudo bar code 117 is printed on an overcoat 114, i.e., the surface of a magnetic card 101, with an infrared absorption ink. Referring to FIG. 7, a direction in which the magnetic card 101 is inserted into a card reader apparatus is defined as a direction indicated by an arrow, the above address bar code 118 is printed at a position located on the leading end side of the magnetic card 101 with respect to the bar code recording area 103 in the card insertion direction, and is printed on a read line which is the same as that of a bar code 115 and the pseudo bar code 117 and along which a read operation is performed by the optical sensor 210.

When the magnetic card 101 is inserted into the card reader apparatus, under the control of the control circuit 202, the optical sensor 210 radiates infrared rays on the address bar code 118, and the position information of the pseudo bar code 117 indicated by the address bar code 118 is read through the optical sensor 210. Subsequently, the bar codes 115 and 117 in the bar code recording area 103 are read through the same optical sensor 210. If the read pseudo bar code 117 is a bar code read at the position indicated by the position information indicated by the address bar code 118, the pseudo bar code 117 is not recognized as the authentic bar code 115. In this case, the pseudo bar code 117 is recognized as the pseudo bar code 117. Note that only the bar code 115 read at a position except for the position indicated by the position information indicated by the address bar code 118 is recognized as the authentic bar code 115.

As described above, since the position information of the pseudo bar code 117 can be indicated by the address bar code 118 on the magnetic card 101, the positions of the pseudo bar codes 117 can be defined in units of magnetic cards 101. Therefore, unlike the second embodiment, the position of the pseudo bar code 117 can be made variable depending on magnetic cards.

Note that, in the above embodiment, although the address bar code 118 is printed on the surface of the magnetic card 101, the address bar code 118 may be printed on the magnetic layer 112 like the bar code 115 and the pseudo bar code 117. In addition, in the above second or third embodiment, the position information of the authentic bar code 115 may be indicated in place of the position information of the pseudo bar code 117. In this case, the control circuit 202 recognizes, as the authentic bar code 115, the bar code 115 read at the position indicated by the position information.

As has been described above, according to the present invention, since a pseudo bar code is formed on a magnetic layer on which an authentic bar code is formed, even if a protection layer or the like for protecting the bar code is rubbed with a file or the like to expose the bar code and to visually recognize it, the bar code is visually recognized together with the pseudo bar code. For this reason, the bar code cannot be identified from the pseudo bar code and decoded. Therefore, the bar code can be prevented from being illegally rewritten, and counterfeit of a magnetic card based on the illegally rewritten bar code can be prevented.

Since a pseudo bar code consists of a light transmission material, only an authentic bar code consisting of a light absorption material is detected. For this reason, a bar code detection process can be easily constituted. Since a pseudo bar code consists of a light absorption material, a bar code and the pseudo bar code can consist of the same material. For this reason, mass production in manufacturing magnetic cards is improved. Since the pseudo bar code consists of an infrared transmission material, the pseudo bar code can be formed at very low costs. In addition, since a bar code and a pseudo bar code consist of an infrared absorption material, these bar codes can be formed at very low costs.

Since an address bar code indicating the arrangement position of a pseudo bar code is formed, the arrangement position of the pseudo bar code can be made variable. Since the address bar code consists of a light absorption material, the address bar code can be detected using a sensor similar to the sensor for detecting the pseudo bar code. Since the address bar code consists of an infrared absorption material, the address bar code can be formed at very low costs. Since the address bar code is formed on a magnetic card surface, the address bar code can be easily formed. In addition, since the address bar code and the pseudo bar code are sequentially arranged in the insertion direction of the magnetic card, these bar codes can be detected using the same optical sensor.

Since a means for identifying a pseudo bar code formed on the magnetic layer of the magnetic card is arranged in a card reader apparatus, a bar code formed on the magnetic card can be easily identified from the pseudo bar code in a card process. Since the pseudo bar code is identified on the basis of the arrangement position information of the pseudo bar code stored in a memory, the positions of the bar code and pseudo bar code formed on the magnetic card can be accurately identified in the card reader apparatus. Moreover, since the pseudo bar code is identified on the basis of the contents of the address bar code indicating the arrangement position of the pseudo bar code formed on the magnetic card, pseudo bar codes can be formed in units of magnetic cards.

What is claimed:

1. A magnetic card comprising:

a magnetic layer formed on a substrate for recording magnetic information and for reflecting a light radiated on said magnetic card;

a bar code formed on a predetermined area of said magnetic layer, said bar code comprising a light absorption material, said bar code being detected by a lack of reflected light from said magnetic layer;

a protection layer formed on said predetermined area of said magnetic layer for protecting said bar code;

a pseudo bar code formed on said magnetic layer, said pseudo bar code being mixed with said bar code;

an address information code formed in said predetermined area, for indicating a specified position of said pseudo bar code, said address information code comprising a light absorption material, said address information code being arranged on the same read line as said bar code and said pseudo bar code; and wherein said pseudo bar code is arranged with respect to said bar code in said specified position, and said bar code is detected on the basis of a presence or absence of reflected light from said magnetic layer and said specified position of said pseudo bar code; wherein said pseudo bar code has similar visual characteristics providing a camouflage against visual recognition of said bar code;

whereby said magnetic card is made more difficult to be counterfeited because said pseudo bar code can be separated from said bar code using said address information code.

2. A magnetic card according to claim 1, wherein said light absorption material for forming said bar code and said pseudo bar code is an infrared absorption material, and infrared rays are radiated on said bar code and said pseudo bar code to detect said bar code on the basis of the presence or absence of reflected infrared light and said specified position of said pseudo bar code.

3. A magnetic card according to claim 1, wherein said address information code is formed on said protection layer.

4. A magnetic card according to claim 1, wherein said address information code is formed on said magnetic layer.

5. A magnetic card according to claim 1, wherein said light absorption material for forming said bar code, said pseudo bar code, and said address information code is an infrared absorption material, and said bar code is detected on the basis of the presence or absence of reflected infrared light from said bar code and said pseudo bar code, and said specified position of said pseudo bar code indicated by said address information code.

6. A magnetic card according to claim 1, wherein said specified position of said pseudo bar code is recorded at a downstream position of said bar code in a card insertion direction.

7. A magnetic card according to claim 1, further comprising an overcoat formed on said magnetic layer including said protection layer, said overcoat for protecting all underlying layers including said magnetic layer.

8. A card reader apparatus comprising:

read and write means for reading and writing information on and from a magnetic layer of a magnetic card on which a bar code, a pseudo bar code arranged and mixed with said bar code, and an address information code, said magnetic layer of said magnetic card reflecting a light;

an optical sensor for optically reading said bar code, said pseudo bar code and said address information code on the basis of a reflected light from said magnetic layer relating to at least one of said write and read operations of said read and write means;

means for identifying said bar code from said pseudo bar code read by said optical sensor on the basis of a preset position information of said pseudo bar code to detect only said bar code; and an address information code storage memory for storing said preset position information of said pseudo bar code, wherein said identifying means detects said bar code information on the basis of said preset position information stored in said memory.

9. An apparatus according to claim 8, further comprising position information read means for reading out said preset position information of said pseudo bar code from said magnetic card, wherein said preset position information is recorded on said magnetic card, and said identifying means detects said bar code information on a basis of said preset position information read by said position information read means.

10. An apparatus according to claim 9, wherein an address bar code indicating said position information is formed by a light absorption material in said magnetic card on a read line for said bar code and said pseudo bar code, said position information read means is constituted by said optical sensor, and said optical sensor commonly reads said bar code, said pseudo bar code, and said address bar code.

11. A magnetic card comprising:

a magnetic layer formed on a substrate for recording magnetic information and for reflecting light;

a bar code formed on a predetermined area of said magnetic layer containing significant data information, said bar code comprising a light absorption material, said bar code being detected by a lack of reflected light from said magnetic layer;

a protection layer formed over said predetermined area of said magnetic layer for protecting said bar code;

a pseudo bar code formed on said magnetic layer, said pseudo bar code being mixed with said bar code, such that said pseudo bar code has similar visual characteristics thereby providing a camouflage against visual recognition, said pseudo bar code arranged with respect to said bar code in a predetermined specified position, said bar code further being detected on the basis of a presence or absence of reflected light from said magnetic layer and said predetermined specified position of said pseudo bar code; and an address information code, formed on a second predetermined area of said magnetic card separate from said bar code for indicating said predetermined specified position of said pseudo bar code, thereby allowing separation of said bar code from said pseudo bar code such that said bar code can only be determined separate from said pseudo bar code using said address information code.

* * * * *

UNITED STATES PATENT AND TRADEMARK OFFICE
CERTIFICATE OF CORRECTION

PATENT NO. : 5,545,883  
DATED : August 13, 1996  
INVENTOR(S) : Sasou et al

It is certified that error appears in the above-indentified patent and that said Letters Patent is hereby corrected as shown below:

Abstract, item [57], line 11, delete "form" insert ---- from ----.

Column 1, line 17, delete "is formed".

Column 1, line 20, after "out," insert ---- and ----.

Column 2, line 35, delete "car" insert ---- card ----.

Column 3, line 38, after "are" insert ---- visually ----.

Column 3, line 45, delete "of".

Column 3, line 63, after "101" insert ---- are depicted ----.

Column 4, line 8, after "101" insert ---- , which ----.

Column 7, line 63, after "bar code," first occurrence, insert ---- and ----.

Column 7, line 63, after "bar code" second occurrence, insert ---- are ----.

UNITED STATES PATENT AND TRADEMARK OFFICE
CERTIFICATE OF CORRECTION

PATENT NO. : 5,545,883
DATED : August 13, 1996
INVENTOR(S) : Sasou et al

It is certified that error appears in the above-indentified patent and that said Letters Patent is hereby corrected as shown below:

Column 8, line 1, delete "said bar code", insert ---- each other ----.

Column 8, lines 2 and 3, delete in their entirety, insert ---- code located on said magnetic card separate from said bar code and said pseudo bar code, said address information code providing a preset position information of said pseudo bar code; ----.

Column 8, line 7, delete "said", insert ---- the ----.

Column 8, line 11, delete "a", insert ---- said ----.

Column 8, line 17, delete "information".

UNITED STATES PATENT AND TRADEMARK OFFICE
CERTIFICATE OF CORRECTION

PATENT NO. : 5,545,883  
DATED : August 13, 1996  
INVENTOR(S) : Sasou et al

Page 3 of 3

It is certified that error appears in the above-indentified patent and that said Letters Patent is hereby corrected as shown below:

Column 8, line 28, delete "bar", insert --information--.

Signed and Sealed this

Twenty-fifth Day of February, 1997

Attest:

BRUCE LEHMAN

*Attesting Officer*   *Commissioner of Patents and Trademarks*